Patented Aug. 19, 1947

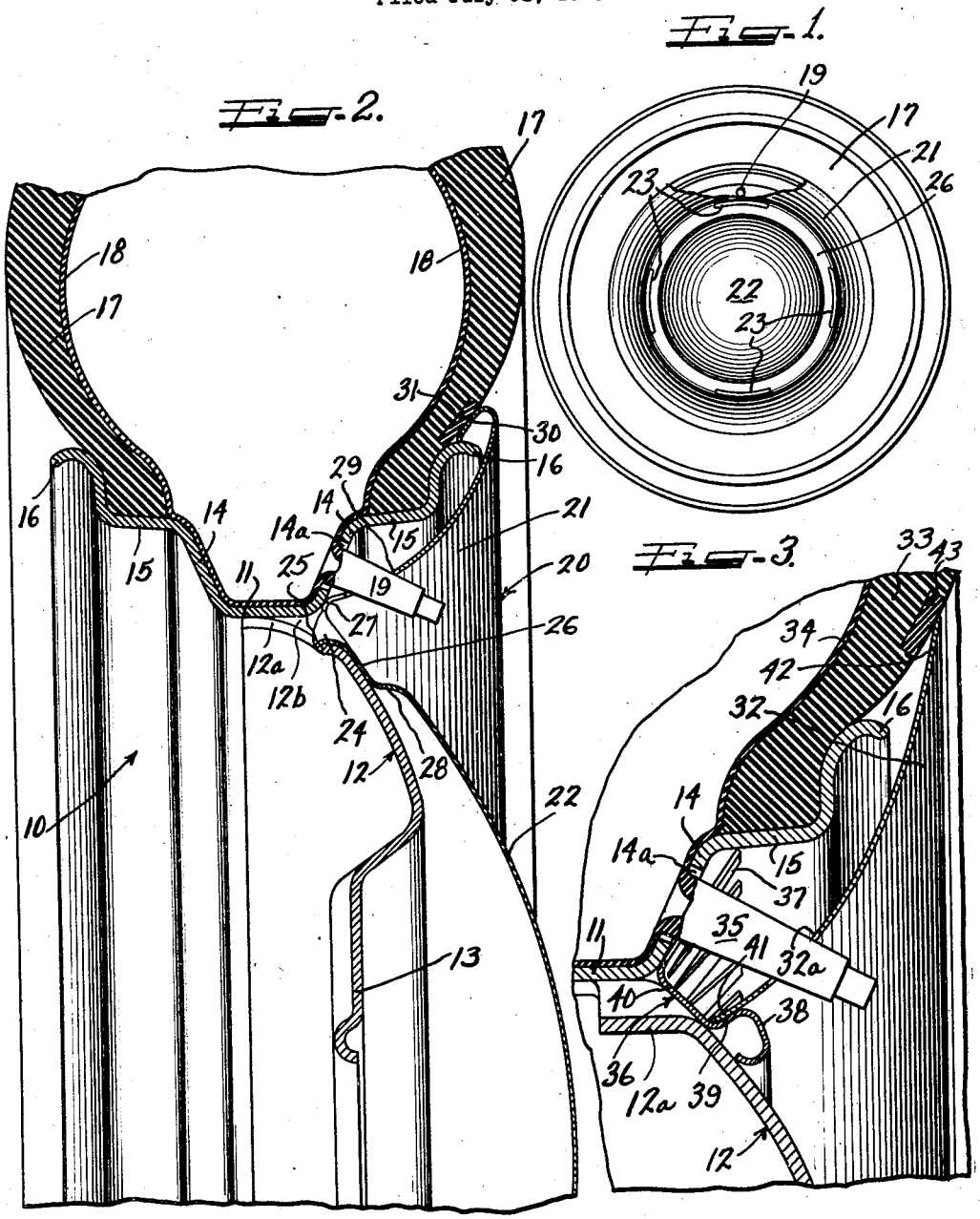

2,426,109

UNITED STATES PATENT OFFICE 2,426,109

WHEEL STRUCTURE

George Albert Lyon, Allenhurst, N. J.

Application July 31, 1943, Serial No. 496,890

3 Claims. (Cl. 301—37)

This invention is directed to an improved wheel assembly and more particularly to an improved cover arrangement therefor.

It is an important object of the invention to provide in a cover assembly for a wheel structure, an improved arrangement wherein the cover may be constructed to conceal the junction between the edge portion of a tire rim and a tire therein and yet wherein the tire is protected against destruction by abrasion of a portion of the cover assembly which abuts the same, particularly during lateral expansion of the side wall of the tire when operated under load bearing conditions.

It is another object of the invention to provide for a wheel an improved cover assembly in which the radially outer portion is provided with a cross-sectional configuration of such shape and magnitude that it extends radially outwardly beyond the edge portion of a tire rim over which it is disposed and adjacent the adjacent side wall of a tire therein to conceal the junction between the edge portion of the tire rim and the tire side wall and to simulate the cross-sectional configuration of the adjacent side wall of the tire to give the appearance of being a part thereof and to appear as the white side wall of a massive tire mounted upon a wheel structure of minimum dimensions when colored white.

With a cover assembly of this character, it has been found that preferably the outer edge of the cover member should be disposed in close proximity to the adjacent portion of the side wall of the tire. It has also been found that when a pneumatic tire is operated under load bearing conditions, the portion thereof at the bottom of the wheel which bears the load is expanded laterally, whereby the side walls move axially into abutment with the closely adjacent edge of the cover member. Under these circumstances, the edge repeatedly abuts the tire and tends to abrade the same and to wear a circular portion of the side wall of the tire, thus considerably weakening the same. Furthermore since the tire is constructed from a resilient material such as rubber, the edge of the cover under the above mentioned circumstances tends to bite into the side wall of the tire and thus resists any sliding action thereover to accommodate the axial expansion of the side wall. It is a further object of the invention to provide an improved tire construction in which the above mentioned difficulties are eliminated.

To this end and as a further object of the invention there is provided herein an improved tire in which there is incorporated a relatively smooth, hardened side wall section in the vicinity of the side wall which is normally abutted and abraded by the edge of the cover member.

It is still another object of the invention to provide an improved tire having at least one side wall in which a relatively hard, smooth circular insert is disposed, this insert having an outer surface arranged to slidingly receive the edge of a circular cover member which extends radially outwardly beyond the edge portion of the tire rim in which the tire is disposed.

In accordance with the general features of my invention there is provided herein a wheel structure having a tire rim of the drop center type and a central load bearing portion, there being disposed on the outer side of the wheel a cover including a radially outwardly extending portion which protrudes radially beyond the edge portion of the tire rim into overlapping relationship with the side wall of a tire in the rim, the cover being preferably constructed from a synthetic sheet material and having physical characteristics enabling it to flex locally resiliently with lateral, axial expansion of the tire when operated under load bearing conditions, the tire being provided with a circular insert in the adjacent side wall thereof, said insert being arranged to occupy that area of the surface of the side wall which is normally engaged by the edge portion of the tire during lateral expansion therefor.

Many other objects and advantages of the invention will become apparent from the following description and accompanying drawing in which:

Figure 1 is a side elevational view of a wheel structure embodying my invention;

Figure 2 is a fragmentary radial cross-sectional view of a construction such as that shown in Figure 1; and Figure 3 is a fragmentary radial cross-sectional view of a modified form of my invention.

It will be understood that the embodiments shown herein are for illustrative purposes only and may be changed or modified without departing from the spirit and scope of the invention as set forth in the appended claims.

As shown most clearly in Figure 2, the wheel structure shown herein, with which my invention is associated, includes a multi-flange drop center tire rim 10 having a base flange 11 to which an axially extending flange 12 is secured as by welding or riveting or the like to provide a unitary wheel structure. The central load bearing portion 12 is further provided with a central bolt-on flange portion 13 by means of which the wheel structure may be suitably secured to a vehicle by attachment to an appurtenance thereof such as the brake drum or the like.

The tire rim 10 is further provided with opposite side wall flanges 14, opposite intermediate flanges 15 and opposite edge portions 16, between which are retained the radially inner portions of a tire 17 having an inner tube 18 and a valve stem 19 which is arranged to extend through a suitable aperture 14a in the adjacent side wall 14.

As will be seen from Figures 1 and 2, the flange 12a of the central load bearing portion 12 is provided with circumferentially spaced depressed portions which afford circumferentially spaced openings 12b through the wheel structure proper.

In the construction of Figure 2 the cover member is indicated at 20 and is preferably formed from a light weight sheet material such as synthetic plastic sheet material whereby the cover is self-sustaining as to form and yet may be locally, resiliently, temporarily flexed to accommodate distorting pressures imposed thereon and will readily snap back to its original configuration upon release of these distorting pressures.

The principal parts of the cover member 20 include a radially outer portion 21 and a central hub cap simulating portion 22, the former being arranged to overlie the outer side of the tire rim to conceal the same and the latter being arranged to overlie the central part of the wheel to conceal the same.

To the end that the cover assembly may be readily and yet detachably engaged with the wheel structure and in order that free passage of air through the wheel structure for ventilation of the appurtenant parts of the vehicle, such as the brake drum, may be obtained, the portion of the cover 20 intermediate the parts 21 and 22 thereof is punched out to provide apertures 23 therein, the punched out sections being arranged to conform substantially to and to be aligned with the apertures 12b in the wheel structure and comprising bent back clips 24 which are preferably curled downwardly at the axially inner edge thereof as shown at 25 to extend over and around the axially inner edge of the adjacent portion of the flange 12a of the load bearing portion 12 of the wheel structure. The annular portion 26 of the cover member, disposed radially inwardly of the apertures 23 thereof is preferably configurated to lie in surface engagement with the adjacent portion at the outer surface of the central load bearing part 12 of the wheel structure, thereby to serve as an alignment and supporting instrumentality for the entire wheel structure to insure proper axial spacing thereof with respect to the wheel, this axial spacing being further obtained by the abutment of the axially inwardly convex portion 27 of the cover member which is disposed in radial and circumferential alignment between the apertures 23.

The central portion 22 of the cover member 20 is defined by a continuous, integral, axially outwardly extending flange 28 which affords axial outward disposal of this crown-like portion 22. It will be understood, of course, that the cover member is provided with an aperture 29 with which the valve stem 19 is aligned and through which the stem extends to be accessible for inflation of the tire.

The radially outer part 21 of the cover member 20 is preferably provided with a cross-sectional configuration whereby it simulates the configuration of the adjacent side wall of the tire 17, thereby to constitute a part thereof and to give the appearance of being a continuation thereof when mounted upon the wheel assembly. Furthermore, if the cover portion 21 is colored white it will be seen that it will give the appearance of being a white side wall of a massive tire mounted upon a wheel structure.

As indicated previously, the above mentioned visual effect is augmented considerably by the extension of the radially outer margin of the cover portion 21 radially outwardly beyond the edge portion 16, thereby to conceal the junction between the tire 17 and the edge portion of the tire rim 10. In the embodiment of Figure 2 the cover part 21 extends radially outwardly beyond the edge portion 16 and is then provided with an axial inward turned back flange portion 30, the axial inner surface of which is arranged to rest against the adjacent portion of the side wall of the tire and thus is urged axially outwardly from its normal position upon axial outward expansion of the tire under load bearing conditions.

As also indicated previously, this abutment between the outer edge portion of the cover member and the side wall of the tire results in abrasion of the tire by the cover with the result that the tire is worn along a circular line and is thus considerably weakened.

To the end that this abrasion of the tire may be eliminated there is provided therein an annulus 31 of hard rubber, or the like, this annulus being embedded in the side wall of the tire 17 so that the outer surface thereof constitutes a continuation of the adjacent portion of the surface of the side wall. As will be seen from Figure 2, the insert 31 is of such a diameter that it is in alignment with the portion of the cover part 21 which abuts the tire when the cover is mounted in position over the wheel structure. Thus upon relative movement of the tire side wall there is provided for the portion of the cover which contacts the same a smooth, wear resistant sliding surface which is in no way effected detrimentally by the resulting abrasion between the tire and the cover. While the member 31 is shown as an insert in the present instance, it will be clearly understood that similar results may be obtained by local treatment of the side wall of the tire to render the material thereof relatively hard and smooth.

In attaching the cover member 20 to the wheel structure it will be seen that mere axial inward movement thereof relative to the wheel with the clips 24 aligned with the respective circumferentially spaced wheel openings will result in the clips extending into the openings so that the edges 25 thereof will curl around the axially inner edge of the flange 12 to obtain a secure yet detachable engageemnt between the cover and the wheel. In order to remove the cover from the wheel structure it is merely necessary for the operator to insert the fingers between the flange 30 of the cover and the side wall of the tire and to move the cover axially outwardly whereupon the clips 24 become disengaged from the wheel and the cover may be completely removed therefrom.

In the construction of Figure 3 there is disposed a wheel structure similar to that shown in Figures 1 and 2. In this embodiment, however, the wheel cover comprises merely an annulus 32 having the characteristics of the cover part 21 described previously. It will be seen that the annulus 32 is provided with a cross-sectional configuration of such curvature as to simulate the curvature of the side wall of the tire 33 with which it is associated, this tire being provided with an inner tube 34 having a valve stem 35 extending through the aperture 14a in the adjacent side wall flange 14. In order that the cover member 32 may be securely retained upon the wheel structure there is provided herein an annular retaining member 36 having at the radial outer part thereof, radially outwardly extending resilient fingers 37, the ends of which normally define a circle having a larger diameter than that prescribed by the radially inner surface of the adjacent intermediate flange 15. Thus when the member 36 is urged axially inwardly of the wheel structure it will be seen that the fingers 37 will be urged radially inwardly and will thus tend to spring outwardly and in doing so will bitingly engage the radially inner surface of the intermediate flange 15 to provide a secure retaining engagement between the retaining member 36 and the wheel structure.

The retaining member 36 is provided at the radially inner margin thereof with an axially outwardly extending bead 38, there being a radially outwardly facing groove 39 formed between the intermediate portion 40 of the retaining member and the bead 38 thereof. The radially inner edge portion 41 of the cover member 32 is arranged to be resiliently forced into the groove 39 of the retaining member whereby these parts may be secured together as a unit prior to the attachment thereof to the wheel structure. As in the construction of Figure 2, the cover member 32 is preferably provided with an aperture 32a which is arranged to be aligned with the tire valve stem 35 so that the stem may extend therethrough to be accessible for inflation of the tire.

In the construction of Figure 3, the radially outer marginal portion 42 extends beyond the edge portion 16 of the tire rim and into engagement with the side wall of the tire. Thus in this construction also the lateral, axial expansion of the tire under load bearing conditions will cause the side wall thereof to press against the outer edge of the cover thereby causing a sliding action between the cover and the adjacent portion of the outer surface of the side wall. To the end that the tire may be protected against damage during this lateral expansion thereof, there is provided an annular insert 43 which is of such a size that the outer surface thereof is disposed in alignment with the edge of the cover member 32 and so that it constitutes a continuation of the remaining surface of the side wall of the tire.

From the foregoing it will be seen that there is provided herein an improved wheel cover and tire construction wherein the cover may extend radially outwardly of an edge portion of the tire rim and into engagement with the adjacent portion of the adjacent side wall of the tire and yet may slidably engage the tire without unduly deteriorating the same.

What I claim is:

1. The combination of a wheel comprising multi-flange rim and body parts and a tire mounted in said rim part having an outer side wall thereof formed with a wear-resisting hardened portion adjacent an outer edge of the rim part with a resiliently deflectable circular cover for substantially covering the exposed outer side flanges of the rim part and having a radially inner part thereof attached to one of said wheel parts and an outer free margin extending radially beyond the rim part for transversely flexing relative to said attachment as well as for bearing against said hardened portion of the tire for relative sliding contact therewith in the operation of the wheel.

2. The combination of claim 1 further characterized by said outer margin comprising a curved lip with its extremity terminating on said hardened portion.

3. The combination of claim 1 further characterized by said outer margin comprising an underturned concealed outer edge inclined at an angle to the vertical plane of the wheel so as to closely hug said hardened portion.

GEORGE ALBERT LYON.

REFERENCES CITED

The following references are of record in the file of this patent:

UNITED STATES PATENTS

| Number | Name | Date |
|---|---|---|
| 1,465,697 | Thacher | Aug. 21, 1923 |
| 1,575,966 | Brittain | Mar. 9, 1926 |
| 1,765,858 | Anderson | June 24, 1930 |
| 603,161 | Bagot | Apr. 26, 1898 |
| 1,968,076 | Goodyear | July 31, 1934 |

FOREIGN PATENTS

| Number | Country | Date |
|---|---|---|
| 436,544 | Great Britain | Oct. 14, 1935 |